(12) United States Patent
Hattori et al.

(10) Patent No.: US 6,585,801 B2
(45) Date of Patent: Jul. 1, 2003

(54) OPERATING METHOD OF GAS ENGINE ACCOMMODATING TO SOUR GAS AND THE SYSTEM THEREOF

(75) Inventors: Toshiro Hattori, Tokyo (JP); Yujiro Shinoda, Tokyo (JP); Kazue Yamada, Tokyo (JP)

(73) Assignee: Mayekawa Mfg. Co., Ltd., Tokyo (JP)

( * ) Notice: Subject to any disclaimer, the term of this patent is extended or adjusted under 35 U.S.C. 154(b) by 0 days.

(21) Appl. No.: 09/982,526

(22) Filed: Oct. 19, 2001

(65) Prior Publication Data

US 2003/0084787 A1 May 8, 2003

(51) Int. Cl.⁷ .......................... B01D 53/04; B01D 53/22
(52) U.S. Cl. .................... 95/49; 95/96; 95/136; 96/4; 96/108; 96/134; 96/142
(58) Field of Search ................ 95/39, 41, 45, 95/49, 96, 136; 96/4, 7–10, 108, 134, 136, 142

(56) References Cited

U.S. PATENT DOCUMENTS

| | | | | |
|---|---|---|---|---|
| 3,087,291 A | * | 4/1963 | Jackson et al. ............... 95/136 |
| 3,534,528 A | * | 10/1970 | Porter ........................... 95/49 |
| 4,347,811 A | * | 9/1982 | Lee ............................ 95/136 X |
| 4,370,150 A | | 1/1983 | Fenstermaker ................. 55/16 |
| 4,589,896 A | * | 5/1986 | Chen et al. .................. 95/49 X |
| 4,681,612 A | * | 7/1987 | O'Brien et al. ............. 95/39 X |
| 4,881,953 A | * | 11/1989 | Prasad et al. ................... 95/41 |
| RE33,678 E | * | 9/1991 | Campbell et al. ............... 95/39 |
| 5,264,193 A | * | 11/1993 | Corcoran, Jr. et al. ..... 95/136 X |
| 5,332,424 A | * | 7/1994 | Rao et al. .................... 95/49 X |
| 5,393,328 A | * | 2/1995 | Barbe ............................. 96/4 |
| 5,429,662 A | * | 7/1995 | Fillet ......................... 95/41 X |
| 5,451,249 A | * | 9/1995 | Spiegel et al. ............ 95/136 X |
| 5,558,698 A | * | 9/1996 | Baker et al. .................... 95/49 |
| 5,772,734 A | * | 6/1998 | Baker et al. ................. 96/4 X |
| 5,976,221 A | * | 11/1999 | Bowman et al. ............. 96/4 X |
| 6,053,965 A | | 4/2000 | Lokhandwala ................. 95/49 |
| 6,071,326 A | * | 6/2000 | Hall ........................ 95/136 X |
| 6,193,785 B1 | * | 2/2001 | Huf .......................... 96/10 X |
| 6,315,814 B1 | * | 11/2001 | Barry et al. ................. 96/4 X |

* cited by examiner

Primary Examiner—Robert H. Spitzer
(74) Attorney, Agent, or Firm—Crowell & Moring LLP

(57) ABSTRACT

The operating system of a gas engine accommodating to sour gas comprises a sour gas compressing and feeding part including a compressor 11 and a gas engine 12, a pre-membrane-treatment 13 for obtaining a compressed gas of proper temperature 13a removed of oil, solid mixture, etc. from the high pressure, high temperature sour gas 11a discharged from the compressor, a preceding step filter 18 for removing a minute amount of oil and water contained in the branched off gas 13b of the compressed gas of proper temperature 13a, a membrane separator for separating the gas from the filter 18 into sweet gas 21 and the hydrogen sulfide gas, and an adsorptive separator 20 through which sweet gas is obtained only at the time of starting of the compressor 11.

10 Claims, 3 Drawing Sheets

OPERATING METHOD OF GAS ENGINE ACCOMMODATING TO SOUR GAS AND THE SYSTEM THEREOF

BACKGROUND OF THE INVENTION

1. Field of the Invention

The present invention relates to the method of operating a gas engine accommodating to sour gas, in which maintenance free, continuous operation of the gas engine for driving a compressor to pressure feed the gas in a gas field scattered in vast wasteland is made possible by the use of sweet gas decreased of hydrogen sulfide to such extent as causing no damage to the gas engine.

More specifically, the invention relates to the method of operating a gas engine accommodating to sour gas, in which sweet gas is created by separating hydrogen sulfide from a part of the compressed sour gas after removal of water and oil from the sour gas produced in a gas field to be pressure fed to a natural gas treating plant, the sweet gas is supplied to the gas engine to drive the compressor for compressing the sour gas, enabling maintenance free, continuous operation under the severe weather condition in a district where utilities such as electricity and water supply are not available and people seldom approach in winter season, and enabling atmospheric pollution preventing treatment by returning the separated hydrogen sulfide into the sour gas without releasing it to the atmosphere.

2. Description of the Related Art

In natural gas markets in the USA, Canada, and so forth, the natural gas is pressure fed by compressors driven by gas engines. Sweet gas not containing hydrogen sulfide has been used as fuel for gas engines in order to evade damage to the gas engines.

However, in recent years, sweet gas not containing hydrogen sulfide tends to be depleted, and the use of sour gas containing hydrogen sulfide is becoming unavoidable.

In the raw natural gas obtained in a gas field is contained frequently hydrogen sulfide and its concentration is often different according to the district where the gas field exist. This hydrogen sulfide generates corrosive substance when reacted with the water in the gas and induces corrosion in the gas engine to cause failure.

Under the situation where sweet gas not containing hydrogen sulfide is being depleted, the use of sour gas containing hydrogen sulfide is becoming unavoidable, and appearance of a gas engine which can accommodate to sour gas is strongly demanded.

On the other hand, when the sour gas is combusted as fuel, combustion gas containing a large amount of sulfur is exhausted from the gas engine, inducing environmental destruction due to atmospheric pollution. Now the situation is that the provision of an expensive exhaust gas treatment apparatus is inevitable for preventing air pollution even in the district where emission regulations are not enforced on the supposition that there also will be enforced regulations in near future.

Therefore, if it is possible to reduce sour gas to sweet gas containing less hydrogen sulfide on the fuel supply side to the gas engines, that makes possible the continued usage of conventional gas engine accommodating to sweet gas, and as the fuel is removed of said sulfur, $SO_2$ buildup after combustion is eliminated, which contributes to the suppression of environmental destruction.

As a means for excluding hydrogen sulfide from sour gas is used an adsorption type, membrane separator type, or combination of both type, and a variety of means are proposed and applied for patent.

Many of the adsorption type are disposable, and in the case of reusable type by reactivation, a heat source or gas for reactivation is needed, which requires time and cost.

On the other hand, a membrane separator type has an advantage in that it enables maintenance free, continuous operation for a prolonged time period when service condition is properly determined.

Inventions concerning the apparatus for making sweet gas utilizing membrane separator are disclosed in U.S. Pat. No. 4,370,150, and U.S. Pat. No. 6,053,965.

The usage of membrane separator type is thought to be most suitable in point of view of that sour gas field is located at a inconvenient place that does not allow permanent residence of people as mentioned above(without any sources of supplying cooling water and electricity, and a place where people can seldom approach during the winter season).

However, in the case of the membrane separator, there is a problem that the separating function can work with high efficiency for high pressure gas, but can not accommodate to low pressure gas at engine start.

Namely, when the membrane type separator is used, as high pressure gas can not be obtained for a while after starting, sweet gas removed of hydrogen sulfide can not be used during that time.

The invention described in the former patent office journal is shown in FIG. 2. As seen in the drawing, sour gas 78 is compressed by a compressor 80 driven by a gas engine 81 to high pressure sour gas 83a to be pressure fed to an external plant. A part of the high pressure gas 83a, which is shown as 83b in FIG. 2 is branched off to be introduced to membrane separator 82, sweet gas 82a obtained therein is supplied to the gas engine 81 which drives the compressor 80. The hydrogen sulfide gas 82b permeated through the membrane in the membrane separator 82 is returned to the suction part of the compressor 80 to be merged with the sour gas 78.

The invention described in the latter patent office journal is shown in FIG. 3. As seen in the drawing, sour gas 85 is compressed by a compressor 90 driven by a gas engine 91 to high pressure sour gas 86 to be pressure fed to an external plant. A part of the high pressure gas 86 is branched off, cooled in a heat exchanger 94 to be reduced to high pressure, low temperature gas, and introduced to a phase separator 95 where hydrocarbons 95a to be merged with the high pressure sour gas 86 are separated. Sweet gas 92a obtained by passing through the membrane unit 92 is reduced to low pressure low temperature sweet gas by the medium of an expansion valve 93, the sweet gas 94a is heated in the heat exchanger 94 and supplied to the gas engine to drive the compressor 90. The hydrogen sulfide 92b permeated through the membrane in the separator unit 92 is returned to the suction part of the compressor 90 to be merged with the sour gas 85.

These two inventions for obtaining sweet gas for operating the gas engine to drive the compressor aim maintenance free, unattended operation for a prolonged period of time, and the features are as follows according to the disclosures.

1. Membrane Material
   a) U.S. Pat. No. 4,370,150:
      dimethyl silicone membrane, silicone polycarbonate membrane, polysulfone membrane with polyalkylsiloxane.
   b) U.S. Pat. No. 6,053,965:
      silicone rubber, polyamide-polyether block copolymer.

2. Temperature Adjustment of the Gas to be Treated
   a) U.S. Pat. No. 4,370,150: not described.
   c) U.S. Pat. No. 6,053,965:
      cooled by the adiabatic expansion of treated gas.
3. Operating Method of the Gas Engine at Starting
   a) U.S. Pat. No. 4,370,150: not described.
   b) U.S. Pat. No. 6,053,965: not described.

In these inventions for obtaining sweet gas for operating the gas engine to drive the compressor by the use of membrane separator, temperature control which is most necessary in the separation by a membrane is not described, and the problem that sweet gas can not be obtained when the compressor output pressure is low for a while after starting is not considered.

Sour gas is frequently a gas saturated with water. The water and hydrogen sulfide in sour gas and the water contained in the air for the combustion in the gas engine cause not only deposit buildup and corrosion resulting in short life of the gas engine but also make the continuous operation impossible.

In the case of systems operated on gas fields in remote districts scattered in vast wasteland where utilities such as electricity and water supply is not always available as mentioned above, sufficient technical considerations should be given for each constituent apparatus to accommodate to the severe continuous operation under severe weather condition.

SUMMARY OF THE INVENTION

The present invention is made in light of the problems mentioned above. The object is to provide an operating method of a gas engine accommodating to sour gas and a system thereof, in which the creation and usage of sweet gas for the combustion in a gas engine are enabled by removing hydrogen, water, liquid mist, and oil from sour gas so that the sour gas containing hydrogen sulfide by high concentration can accommodate to the gas engine, thus enabling the continuous operation of pressure feeding of the sour gas, and the removal treatment for creating the sweet gas is performed in a way the environment pollution is not induced.

The first invention of the present invention is an operating method of a gas engine accommodating to sour gas in the operation of the gas engine for driving a compressor to pressure feed sour gas in a gas field, characterized in that
   said gas engine is operated on a sweet gas removed of hydrogen and water by an adsorptive separating means at the starting thereof to drive said compressor for obtaining high pressure sour gas,
   after said high pressure sour gas is obtained as mentioned above, a properly compressed gas removed of liquid mist, water, and oil by means of a pre-treatment means is obtained from said high pressure sour gas, and said sweet gas is obtained from said properly compressed gas by means of a membrane separator to be supplied to said gas engine for continuous operation.

The invention enables the usage of sweet gas which does not cause problems in the operation of the gas engine for driving the compressor for pressure feeding sour gas from the time the gas engine is started.

That is, the separation of hydrogen sulfide necessary for producing sweet gas is performed through the membrane separator in which the pressurized high pressure sour gas is dealt with in order to perform the separation with certainty and steadiness in stead of performing through the adsorptive separator which is not capable of completely separating hydrogen sulfide, and the adsorptive separator which can perform the separation even when gas pressure is low is used at the start until the high pressure sour gas is produced by the compressor.

Sweet gas obtained through the separation of hydrogen sulfide gas and water from sour gas by adsorptive separation using disposable adsorbent is supplied to the gas engine to drive the compressor when the compressor is started to operate, the operation on said sweet gas is done until the high pressure sour gas is obtained from the compressor, and after that the operation is switched to be done on the sweet gas obtained from the membrane separator.

When the membrane separator is used, liquid mist, water, and oil is removed from the high pressure sour gas produced through the compression of the low pressure sour gas and the temperature is adjusted through treating in the pre-membrane-treatment means to obtain the compressed gas of proper temperature, and sweet gas is obtained from the compressed gas of proper temperature by removing hydrogen sulfide through the membrane separator to be used continuously as fuel of the gas engine after the starting period.

The invention is also characterized in that the hydrogen sulfide separated through a membrane separator is introduced to the compressor together with the low pressure sour gas from a gas field to produce a high pressure sour gas, said high pressure sour gas is removed of liquid mist, water, and oil and adjusted to a proper temperature for membrane treatment by means of a pre-membrane-treatment means to obtain a compressed gas of proper temperature, a part of the compressed gas of proper temperature is returned to the membrane separator, and the remaining large part of the compressed gas of proper temperature is sent to an external plant as sour gas.

The invention describes the treatment of the hydrogen sulfide separated in order to obtain sweet gas from the sour gas. A large part of hydrogen sulfide in the compressed gas already removed of liquid mist, oil, and water and adjusted to a temperature for membrane separation through the pre-membrane-treatment means is permeated through the membrane of the membrane separator, the permeated hydrogen sulfide is returned to the low pressure sour gas from the gas field. The returned hydrogen sulfide is compressed together with the low pressure sour gas to the high pressure sour gas which is removed of liquid mist, water, and water through the pre-membrane-treatment means to be reduced to the compressed gas of proper temperature, a part of which is introduced to the membrane separator and the remaining large part of which is sent to the external plant as sour gas on pressure feeding.

It is suitable that the pre-membrane-treatment means removes the oil mixed in the gas preferably through a primary (and a secondary as needed) oil separator, the temperature is adjusted by an after-cooler, water is removed through an oil separator to obtain the compressed gas of proper temperature removed of liquid mist, oil, and water from the high pressure sour gas.

The invention describes the configuration of the pre-membrane-treatment means, in which mixed oil is completely removed by a primary (and a secondary as needed) oil separator, then cooled by an after-cooler, and further water is removed by an oil separator to obtain dry, compressed gas of proper temperature.

It is suitable that a filter and a heater are provided upstream from the membrane separator so that a minute amount of mixed water and oil are removed and the inlet gas to the membrane separator is heated by the use of the exhaust heat of the gas engine.

In an a preferable embodiment of the invention, a filter with heater is provided upstream from the membrane separator for completely removing a minute amount of mixed water and oil from the compressed gas of proper temperature and heating the gas completely removed of water and oil to a constant temperature most suitable for membrane separation by utilizing the exhaust heat of the gas engine.

It is also suitable that the compressor uses hydrogen sulfide-insolvable mineral oil/synthetic oil as lubrication oil.

By using hydrogen sulfide-insolvable mineral oil/synthetic oil for the lubrication of the compressor, resistivity to the hydrogen sulfide gas returning from the membrane separator and the hydrogen sulfide gas contained in the sour gas supplied from gas field is gained.

The operating system of a gas engine accommodating to sour gas according to the present invention is suitably constituted to use the operating method of a gas engine accommodating to sour gas. The system is an operating system of a gas engine for driving a compressor to pressure feed sour gas in a gas field, characterized in that it comprises a high pressure sour gas producing part for compressing and feeding sour gas by a compressor driven by a gas engine, a pre-membrane-treatment means for obtaining a compressed gas of proper temperature by removing liquid mist, water, and oil from said high pressure sour gas, a membrane separator for obtaining a sweet gas to be supplied to said gas engine by separating hydrogen sulfide from the gas branched off at the outlet of said compressed gas of proper temperature to the outside, the separated hydrogen sulfide being returned to said compressor, and an adsorptive separating means for supplying a sweet gas created by removing hydrogen sulfide and water from sour gas when starting the operation of the system.

The invention describes the constitution of the operating system of a gas engine accommodating to sour gas, which consists of
- a high pressure sour gas producing part for producing the high pressure sour gas to be sent to an external plant by compressing sour gas by a compressor driven by a gas engine,
- a pre-membrane-treatment means for performing the treatment of removing liquid mist, water, and oil, and adjusting the temperature to obtain compressed gas of proper temperature to create sweet gas from the high pressure sour gas,
- a membrane-separating means for obtaining sweet gas from a part of the compressed gas of proper temperature, and
- an adsorptive separator for obtaining sweet gas from the low pressure sour gas in the starting of the system, and is constituted so that a large part of the compressed gas of proper temperature is sent to an external plant as sour gas on pressure feeding, the hydrogen sulfide separated through the membrane separator is directly returned to the compressor to be merged into the low pressure sour gas supplied from a gas field.

The proper gas temperature for membrane separation is preferable to be, for example, in the neighborhood of 40° C. at the entrance to the membrane separator in the case of a hollow-fiber membrane of polyimide.

The membrane-separating means is preferably provided with a filter for removing minute amount of mixed oil and water from the compressed gas adjusted to a proper temperature for membrane separation upstream therefrom and a heater for heating the inlet gas to the membrane separator to a constant temperature in order to obtain high efficiency of membrane separation.

Although the system of the present invention is provided with a pre-membrane-treatment means for removing liquid mist, oil, and water and for adjusting the temperature to a proper temperature necessary for membrane-separation, there is provided in addition a preceding step filter consisting of filters for removing a minute amount of mixed oil and a minute amount of water and a heat exchanger utilizing the exhaust heat of the gas engine for heating the inlet gas to the membrane separator in the coldest season upstream from the membrane separator in order to perform positive pretreatment.

The pre-membrane-treatment means is preferably composed of a primary (and a secondary as needed) oil separator for removing oil from the high pressure sour gas, an aftercooler for controlling the temperature to a proper temperature, and a drain separator for removing water.

A preferable composition of the pre-membrane-treatment means includes a primary (and a secondary as needed) oil separator for separating mixed oil and liquid mist, an aftercooler for adjusting the gas temperature to a proper temperature for membrane separation, and a drain separator for removing water, so that the pre-treatment is carried out to obtain the compressed gas of proper temperature before membrane separation removed of the included oil, solid mixture, and the like to ppm order from the high pressure sour gas compressed by the compressor, the temperature being controlled in the range in which separation efficiency of the membrane in use is high in order to attain good membrane separation.

It is suitable that the compressor is composed so that preferably hydrogen sulfide-insolvable mineral/synthetic oil is used as lubrication oil.

As the hydrogen sulfide separated through the membrane and the sour gas supplied from the gas field containing hydrogen sulfide are sucked and compressed by the compressor, said hydrogen sulfide-insolvable mineral/synthetic oil is used as lubrication oil which is resistant to hydrogen sulfide.

The gas engine is preferable to be provided with a purging circuit including a filter which also serves to neutralize acid for preventing deterioration of the engine oil.

The gas engine employed in the system is operated under severe conditions due to the environment and particularly stable and continuous operation is required. The invention was made to suffice the specific conditions mentioned above, and the engine is provided with a filter circuit as described above for preventing deterioration of engine oil.

THE BEST MODE FOR CARRYING OUT THE INVENTION

A preferred embodiment of the present invention will now be detailed with reference to the accompanying drawings. It is intended, however, that unless particularly specified, dimensions, materials, relative positions and so forth of the constituent parts in the embodiments shall be interpreted as illustrative only not as limitative of the scope of the present invention.

Figure 1:
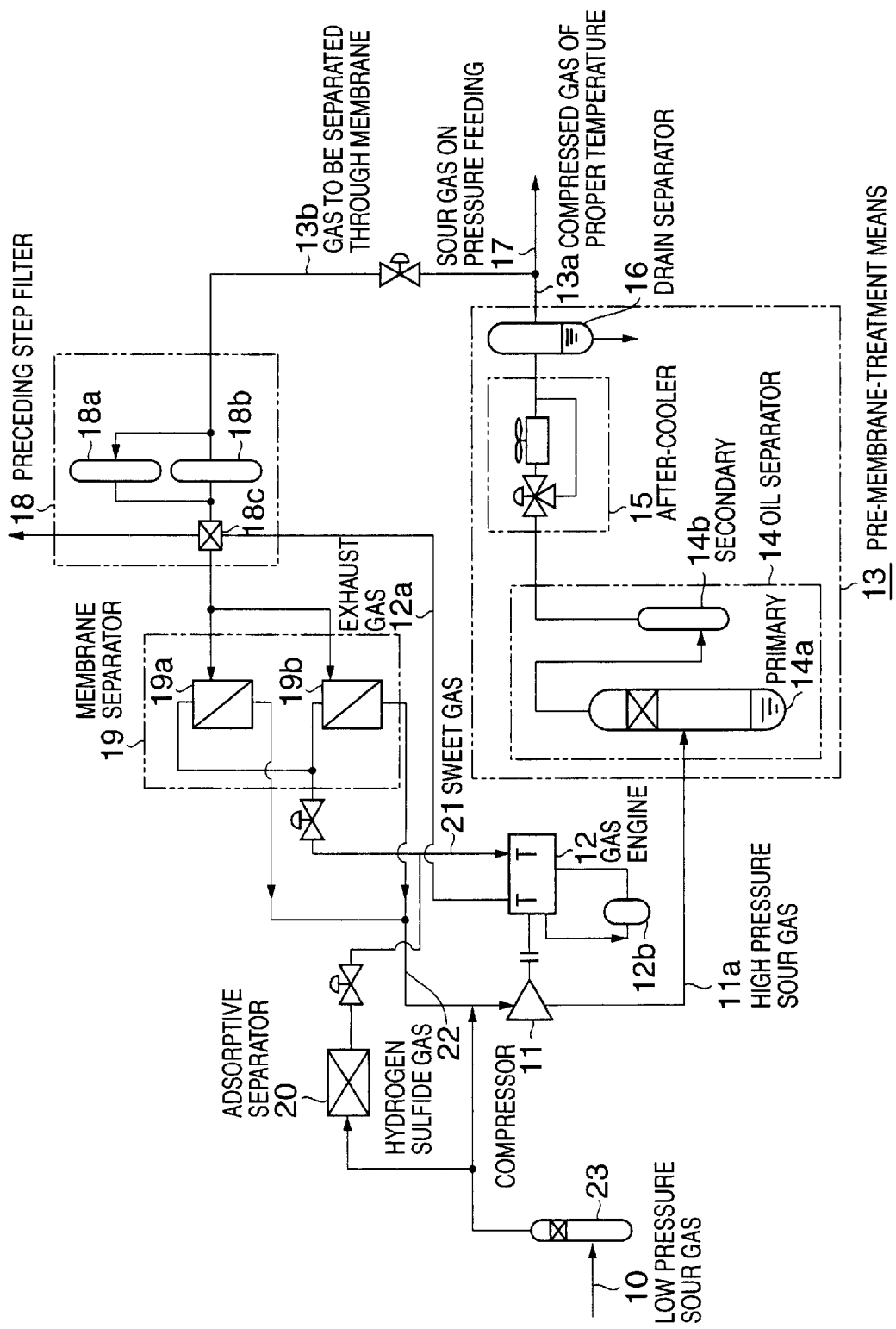
FIG. 1 is a schematic representation showing the first embodiment of configuration of the operation system of a gas engine accommodating to sour gas according to the present invention.
Figure 2:
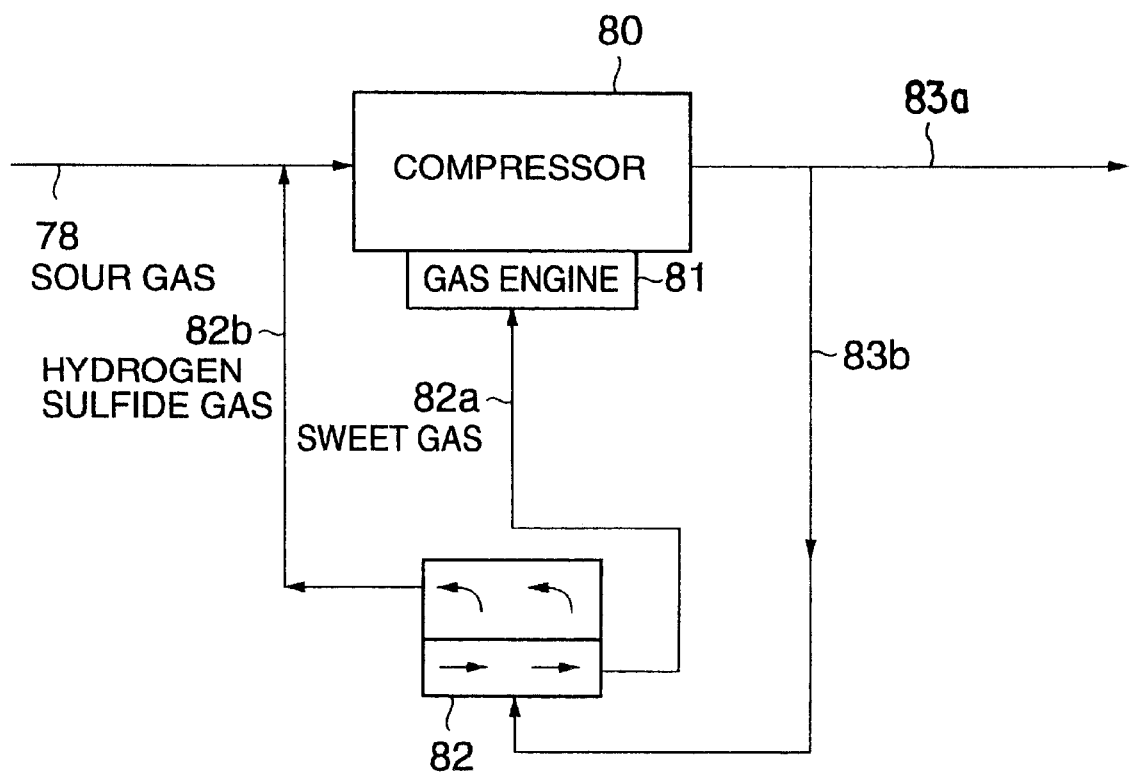
FIG. 2 is a schematic representation showing an example of configuration of conventional system for creating the sweet gas to be used for the gas engine to drive the compressor for sour gas pressure feeding.
Figure 3:
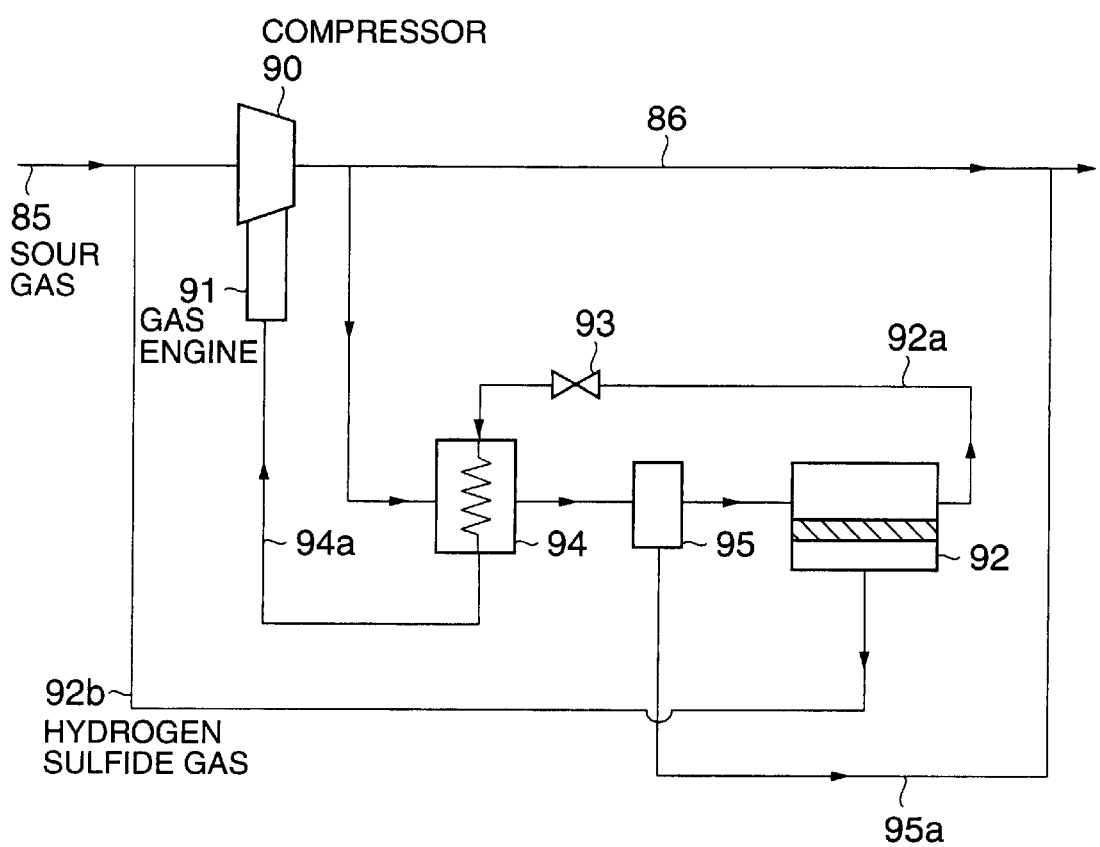
FIG. 3 is another example other than that of FIG. 2.

FIG. 1 is a schematic representation showing the first embodiment of configuration of the operation system of a gas engine accommodating to sour gas according to the present invention.

As shown in FIG. 1, an embodiment of the continuous operation system, in which the separation of hydrogen sulfide mainly carried out through membrane separation, according to the operating system of a gas engine accommodating to sour gas consists of a sour gas compressing and feeding part including a compressor 11 and a gas engine 12 for driving the compressor 11, a pre-membrane-treatment means 13 provided downstream, a preceding step filter 18 provided further downstream, a membrane separator 19 provided still further downstream, an adsorptive separator 20, and a passage for sending out the large part of the compressed gas to the outside.

The pre-membrane-treatment means 13 is composed so that oil, solid mixture, etc. are removed to ppm level of concentration from a high pressure, high temperature sour gas 11a discharged from the compressor 11 which compresses a low pressure sour gas 10 supplied from a gas field not shown in the drawing to obtain a compressed gas 13a having a proper temperature suitable for the membrane separation mentioned later and a part of the compressed gas of proper temperature 13a is branched off as a gas for separation 13b and the remaining large part is send out as a sour gas on pressure feeding 17.

The membrane separator 19 is composed such that the preceding step filter 18 is provided upstream to obtain an inlet gas to the membrane separator 19 from a part 13b of the compressed gas of proper temperature 13a, said inlet gas obtained from the preceding filter 18 being introduced to the membrane separator 19 located downstream to be subjected to membrane separation to be further introduced as sweet gas 21 to the gas engine 12 located downstream.

The adsorptive separator 20 is located on the bypass circuit between the compressor 11 and a filter 23 of low pressure sour gas 10. The low pressure sour gas 10 from gas field is by passed through the bypass circuit only when the system is started to obtain sweet gas 21, which is to be supplied to the gas engine 12 to drive the compressor 11, through the adsorptive separator 20 which adsorbs and separates hydrogen sulfide and water from the low pressure sour gas 10. The low pressure sour gas is bypassed through the bypass circuit until the compressor 11 discharges high pressure, high temperature sour gas 11a.

The pre-membrane-treatment means 13 consists of an oil separator 14 which includes a first separator 14a and a second separator 14b and removes liquid mist and oil mixed in the high pressure, high temperature sour gas 11a to ppm level of concentration, an after-cooler 15 which cools the high pressure, high temperature sour gas removed of impurities by the oil separator 14 to a proper temperature suitable for the separation through membrane, and a drain separator 16 which removes water from the compressed gas of proper temperature 13a adjusted to that temperature by the cooling, and thus reduces the high pressure, high temperature gas 11a to the compressed gas of proper temperature 13a completely removed of oil, water, liquid mist, etc. to enable the separation with good efficiency.

A part of the compressed gas of proper temperature 13a is branched off as the gas 13b to be separated through a membrane, the remaining large part of the gas 13a is fed to an external plant not shown in the drawing as sour gas 17 on pressure feeding.

It is more preferable that, in the case the after-cooler 15 is air cooling type, the temperature of the gas is controlled to a proper temperature by adjusting the air flow rate or by actuating the temperature control valve, and in the case of water cooling type, the temperature is controlled by the water flow rate or temperature valve.

The proper temperature of the inlet gas to the membrane separator for membrane separation is preferable to be, for example, about 30–50° C. in the case of a hollow-fiber membrane of polyimide.

When pressure rises rapidly (for example, 10 kgf/cm$^2$/min), or temperature rises (for example, a rise from 0~10° C. to 100° C.), the damage of the membrane is feared, so when starting the compressor 11, the pressure is allowed to rise gradually by operating the valve by hand or by an automatic the control valve.

When raising the temperature, also the rapid rise in temperature is suppressed by means of the control valve.

The preceding step filter 18 provided upstream from the membrane separator 19 consists of a heater 18c which heats the inlet gas to the membrane separator 19 to a constant temperature by utilizing the exhaust gas 12a of the gas engine 12, and a filter 18a and 18b. The inlet gas to the membrane separator 19 is removed of a minute amount of oil or water mixed in it by the upstream filters 18a, 18b, and heated to a proper temperature to be introduced to the membrane separator 19 located downstream when the atmospheric temperature is low during the winter season.

The membrane separator 19 includes a membrane 19a, 19b which can be used for a prolonged period of time in order to allow them to be used all the time in the operation except for when starting the compressor 11. The membrane is made of polyimide resin and the like capable of being used in the place where electric power and water is not available and for a prolonged period of time.

Hydrogen sulfide gas 22 passed through the membrane joins with the low pressure sour gas 10 containing hydrogen sulfide and water supplied by way of a scrubber 23 to be returned to the compressor 11. The hydrogen sulfide separated through the membrane is compressed together with the low pressure sour gas 10 in the compressor 11 to be included in the high pressure sour gas 11a which passes through the pre-membrane-treatment means 13. A part of the high pressure gas is branched off to the preceding step filter 18 to be introduced to the membrane separator 19 and the remaining part is sent out to an external plant as sour gas 17 on pressure feeding. Accordingly, the hydrogen sulfide is not released to the outside environment.

The sweet gas 21 consists of methane, etc. separated in the membrane separator 19 is supplied to the gas engine 12 to enable the continuous, stable operation of the engine.

An adsorptive separator 20 is used to create the sweet gas 21 from the low pressure sour gas by the adsorptive separation only when the compressor 11 is started, and the sweet gas 21 is supplied to the gas engine 12 until the high pressure sour gas is obtained by the regular operation of the compressor. After that, the membrane separator 19 is set into continuous operation to create continuously the sweet gas 21 to be supplied to the gas engine.

Disposable active carbon or the like is used as adsorbent for the adsorptive separator 20.

Hydrogen sulfide insolvable mineral oil/synthetic oil is used as lubricating oil for the compressor.

An oil purging circuit having a filter 12b serving also to neutralize acid for preventing deterioration of the engine oil is provided in order to enable continuous, stable operation of the gas engine 12.

With the configuration described above, when starting the operation of the system, sweet gas is obtained through the adsorptive separator using the disposable adsorbent to be supplied to the gas engine, and after the compressor sets into regular operation, stable supply of sweet gas is possible through the membrane separator 19.

The separation through membrane is performed with high efficiency by keeping a proper temperature of the inlet gas introduced to the membrane separator by heating with the exhaust heat of the gas engine.

In order to perform the separation with high efficiency, impurities such as liquid mist, oil, and water contained in sour gas are completely removed, and then the temperature of the sour gas is risen to a proper temperature.

As an oil injection type compressor is used, sludge and mist contained in natural gas are removed to some extent.

As to water, liquid water is removed through the filters just before the sour gas enters into the membrane separator. Although gaseous water passes through the filters, the gas is heated to saturation temperature or higher before it enters the membrane separator, so it does not condense in the membrane (gaseous water does not affects adversely to the membrane).

With the configuration cited above, the present invention offers the following effects.

The supply of sweet gas is possible all over the operation including starting by constituting so that, when starting the compressor, an adsorptive separator capable of functioning for low temperature gas is used, after the compressor have set into regular operation, a membrane separation capable of continuous and stable functioning is used.

The separation through a membrane with high efficiency is made possible by removing liquid mist, oil, and water from compressed sour gas and adjusting the temperature of the gas to a proper temperature for membrane separation by pre-treatment, and by removing a minute amount of oil and water contained in the gas and adjusting the temperature of the gas in the succeeding step.

The separated hydrogen sulfide is not emitted to the outside environment.

What is claimed is:

1. An operating method of a gas engine accommodating to sour gas in the operation of the gas engine for driving a compressor to pressure feed sour gas in a gas field, wherein said gas engine is operated on a sweet gas removed of hydrogen and water by an adsorptive separator at the starting thereof to drive said compressor for obtaining high pressure sour gas, after said high pressure sour gas is obtained, a compressed gas removed of liquid mist, water, and oil and adjusted to a proper temperature for membrane treatment by way of a pre-membrane-treator is obtained from said high pressure sour gas, and said sweet gas is obtained from said compressed gas of proper temperature by way of a membrane separator to be supplied to said gas engine for continuous operation.

2. An operating method of a gas engine accommodating to sour gas according to claim 1, wherein said pre-membrane-treator is composed such that said compressed gas of proper temperature removed of liquid mist, oil, and water is obtained by removing the oil mixed in said high pressure sour gas through a primary (and a secondary as needed) oil separator, adjusting to a proper temperature for membrane separation by an after-cooler, and removing water by a drain separator.

3. An operating method of a gas engine accommodating to sour gas according to claim 1, wherein heating of the inlet gas to the membrane separator to a constant temperature is possible by utilizing exhaust gas of said gas engine.

4. An operating method of a gas engine accommodating to sour gas according to claim 1, wherein hydrogen sulfide insolvable mineral oil/synthetic oil is used as lubricant for the compressor.

5. An operating method of a gas engine accommodating to sour gas in the operation of the gas engine for driving a compressor to pressure feed sour gas in a gas field, wherein:

hydrogen sulfide separated through a membrane separator is introduced together with low pressure sour gas from a gas field to obtain a high pressure sour gas, said high pressure sour gas is removed of liquid mist, water, and oil and obtains a compressed gas adjusted by a proper temperature for membrane treatment by way of a pre-membrane-treator, a part of said compressed gas of proper temperature is returned to said membrane separator, and the remaining large part of the compressed gas of proper temperature is sent to an external plant as sour gas, and wherein said pre-membrane-treator is composed such that said compressed gas of proper temperature removed of liquid mist, oil, and water is obtained by removing the oil mixed in said high pressure sour gas through a primary (and a secondary as needed) oil separator, adjusting to a proper temperature for membrane separation by an after-cooler, and removing water by a drain separator.

6. An operating system of a gas engine accommodating to sour gas in the operation of the gas engine for driving a compressor to pressure feed sour gas in a gas field, the system comprising, a high pressure sour gas producing part for compressing and feeding sour gas by the compressor driven by a the gas engine, a pre-membrane-treator for obtaining a compressed gas which is adjusted to a proper temperature for membrane separation, and is removed of liquid mist, water, and oil from the high pressure gas, a membrane separator for obtaining a sweet gas to be supplied to said gas engine by separating hydrogen sulfide from a part of said compressed gas, the separated hydrogen sulfide being returned to said compressor, an adsorptive separating means separator for supplying a sweet gas created by removing hydrogen sulfide and water from sour gas when starting the operation of the system, and a passage for sending the a large part of said compressed gas to an external plant.

7. An operating system of a gas engine accommodating to sour gas according to claim 6, wherein filters for removing a minute amount of oil and water from said compressed gas adjusted to a proper temperature for membrane separation are provided upstream from said membrane separator, and a heater for heating the inlet gas to said membrane separator is provided ahead of said membrane separator downstream from said filters to obtain high efficiency of membrane separation.

8. An operating system of a gas engine accommodating to sour gas according to claim 6, wherein said pre-membrane-treator comprises a primary (and a secondary as needed) oil separator for removing oil from said high pressure sour gas, an after-cooler for adjusting gas temperature to a proper temperature for membrane separation, and an a drain separator for removing water.

9. An operating system of a gas engine accommodating to sour gas according to claim 6, wherein said compressor is composed such that hydrogen sulfide insolvable mineral oil/synthetic oil is used as lubricating oil.

10. An operating system of a gas engine accommodating to sour gas according to claim 6, wherein said gas engine is provided with an oil purging circuit including a filter serving also to neutralize acid for preventing deterioration of the engine oil.

* * * * *